Dec. 19, 1933. G. H. FLETCHER 1,940,299
THRUST BEARING FOR ELECTRIC LOCOMOTIVES
Filed Dec. 26, 1930 2 Sheets-Sheet 1
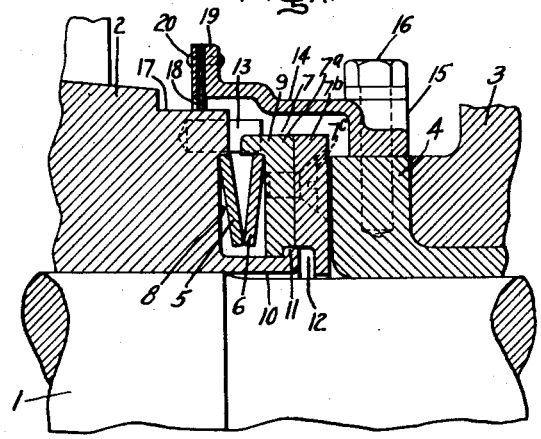
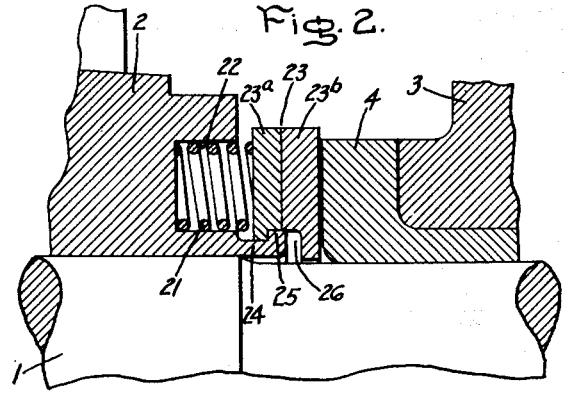
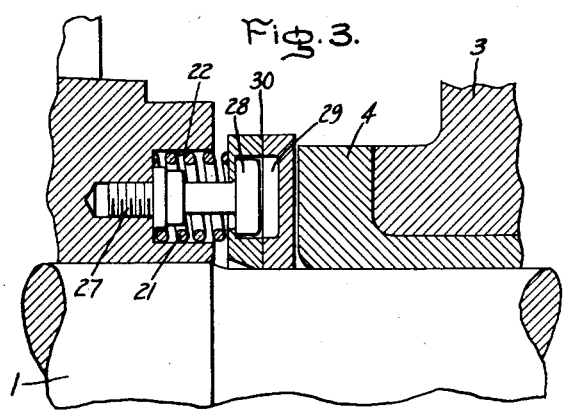
Inventor:
George H. Fletcher,
by Charles E. Tullar
His Attorney.

Dec. 19, 1933.　　　G. H. FLETCHER　　　1,940,299
THRUST BEARING FOR ELECTRIC LOCOMOTIVES
Filed Dec. 26, 1930　　2 Sheets-Sheet 2
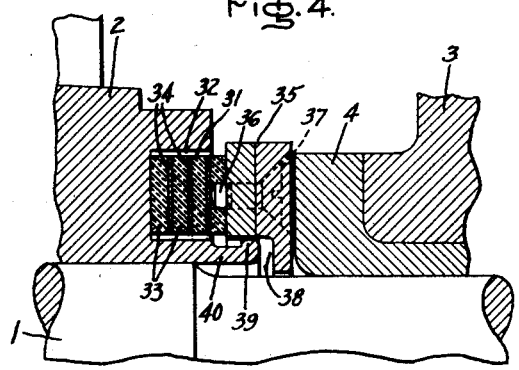
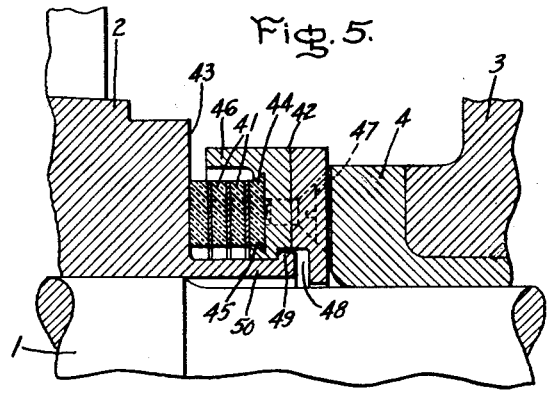
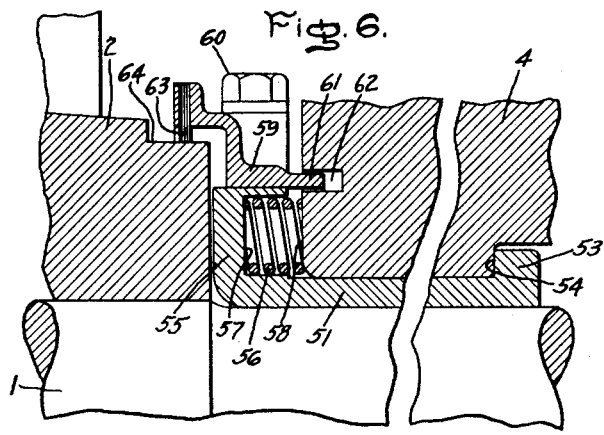
Inventor:
George H. Fletcher,
by *Charles E. Tullar*
His Attorney.

Patented Dec. 19, 1933

1,940,299

UNITED STATES PATENT OFFICE 1,940,299

THRUST BEARING FOR ELECTRIC LOCOMOTIVES

George Herbert Fletcher, Westminster, England, assignor to General Electric Company, a corporation of New York Application December 26, 1930, Serial No. 504,889, and in Great Britain December 30, 1929

2 Claims. (Cl. 308—161)

My invention relates to electric locomotives or other electrically propelled vehicles and refers particularly to locomotives or other vehicles in which a driving motor is wholly or partly supported directly upon an axle of the vehicle.

In such vehicles there may be a risk of relatively heavy impact forces being exerted between the motor and the wheels in a direction parallel to the axle when the locomotive enters curves or the wheels strike irregularities in the track, such impacts being in turn transmitted by the wheels to the rails with damaging effect.

My invention has for its object to avoid or to substantially reduce such impact forces and I accomplish this by providing a resilient device interposed between the motor and the track wheels adapted to resist relative axial movement between the wheels and the portion of the motor mounted upon the axle thereof.

In the drawings, Figs. 1 to 6 inclusive are each fragmentary sectional views of the upper parts of the ends of the axles showing the wheel hub and bearing and a resilient device arranged in accordance with my invention, each of the several figures showing a different embodiment of my invention.

Referring to the drawings, in all of the figures I have shown my invention as applied to the axle 1 of a locomotive having a driving wheel 2 thereon and a bearing sleeve of a motor 3 by which the motor is mounted on the axle.

In a construction of this type, when the locomotive or car rounds a curve or passes over other irregularities in the track lateral movement of the motor is resisted by the wheel. This may cause damaging impact forces to be transmitted to the rails. In accordance with my invention, therefore, a suitable resilient device is interposed between the bearing sleeve and the wheel 2 for preventing these damaging impact forces being transmitted to the rail. I generally prefer to provide an axially slidable thrust member between the wheel and the axle bearing for the motor, and insert springs, rubber pads, or the like between the thrust member and the wheel, the thrust member being preferably arranged to rotate with the wheel. The arrangement may be carried out in such manner that the resilient means employed is under compression at all times, and furthermore in order to prevent damage to the resilient means stop means is provided to limit the maximum compression to which the resilient means may be subjected when in service.

In Fig. 1 the resilient device comprises concave annular springs 5 and 6 arranged between the wheel 2 and an annular thrust ring 7 adjacent a bearing sleeve 4 on the motor 3. The outer periphery of the spring 5 is seated in a recess 8 in the wheel, and the outer periphery of the spring 6 seated on a flange 9 on the thrust ring, the inner edges of the springs engaging each other, so that force is transmitted from one to the other. In order to limit the extent of compression and expansion of the springs and prevent the thrust ring being worn by running in contact with the motor, I provide an annular flange 10 on the wheel having an enlargement 11 arranged in a recess 12 in the thrust ring 7. The axial movement of the thrust ring is limited in both directions by the enlargement 11 abutting the ends of the recess 12, so that excessive wear on the thrust ring and compression beyond the elastic limit of the spring are avoided. It is apparent that if the thrust ring 7 were permitted to turn with respect to the wheel 2 that the springs and seat would soon become worn. I, therefore, provide pins 13 carried by the wheel 2 which slidably fit in notches formed in the periphery of the thrust ring 7. The assembly of the thrust ring is facilitated by making it in two parts 7a and 7b, each of which is made of two semi-circular halves having their abutting ends staggered and secured by screws indicated in dotted lines at 7c.

In order to exclude dust or other foreign matter from the resilient device above described I provide a cylindrical shield 14 having an inturned flange 15 which is secured to the bearing sleeve 4 by cap screws 16. The shield 14 extends about a cylindrical surface 17 formed on the hub of the wheel 2 and is provided with a packing ring 18 engaging the cylindrical surface and secured to the flange 19 of the shield by rivets 20.

The constructions shown in Figs. 2, 3, 4 and 5 are similar to that shown in Fig. 1, and it is to be understood that, if desired, a pin or other suitable device similar to the pin 13 shown in Fig. 1 may be employed for causing the thrust ring to turn with the wheel 2, and that a dust shield construction like that indicated at 14 in Fig. 1 may also be employed.

In Fig. 2 the resilient device includes a plurality of helical coil springs 21 arranged in cylindrical recesses 22 having their axes parallel to the axle 1. The springs 22 are retained in compression between the bottom of the recesses 22 and the thrust ring 23. The thrust ring 23 is made in two parts, and each of the parts 23a and 23b are made in two semi-circular halves secured together by screws. The hub of the wheel 2 is provided with an annular flange 24 having an enlargement 25 in the end thereof arranged in a recess 26 formed between the halves of the thrust ring so as to limit the axial movement of the thrust ring in compressing the spring 21.

The construction shown in Fig. 3 is like that shown in Fig. 2 except that instead of limiting the axial movement of the thrust ring by a flange on the hub of the wheel 2, I prefer to provide a plurality of studs 27 arranged coaxially of the springs 21 and having an enlarged head 28 arranged in recesses 29 formed in the thrust ring 30.

In the construction shown in Fig. 4 a plurality of resilient rubber plugs 31 are provided which are arranged in cylindrical recesses 32 in the hub of the wheel 2. The resilient plugs 31 are preferably made of several layers of rubber 33 separated by metal, cloth or other reinforcing material indicated at 34. These plugs are retained under compression between the bottoms of the recesses 31 and the thrust ring 35, pins 36 being provided on the thrust ring for maintaining the plugs in the desired relation to the ring. The thrust ring 35 is made in two parts and secured together by screws 37 and the inner periphery of the thrust ring is provided with a recess 38 in which an enlargement 39 of an annular flange 40 of the wheel is arranged to limit the axial movement of the thrust ring.

The construction shown in Fig. 5 is similar to the construction shown in Fig. 4 and includes an annular resilient rubber ring 41 which is retained under compression between a thrust ring 42 and the end 43 of the hub of the wheel 2. The resilient ring is secured to the thrust ring by the annular dovetailed portion 44 which is fitted in an annular dovetailed slot 45 formed in the thrust ring. The thrust ring is provided with an annular flange 46 which partially encloses the resilient ring 41. The thrust ring 42 is made in two parts which are secured together by a screw 47, and the axial movement of the thrust ring is limited by providing a recess 48 therein in which is arranged enlarged portion 49 of an annular flange 50 of the hub of the wheel.

In construction shown in Figs. 1 to 5 inclusive the thrust ring will run out of contact with the motor bearing or wheel and when the locomotive or car rounds a curve or passes over any irregularity in the track movement of the motor toward the wheel will be resiliently resisted so as to reduce or to prevent any damaging shocks being transmitted to the rail.

In the construction shown in Fig. 6, the bearing which supports the motor on the axle 1 is employed as a thrust ring. I accomplish this by slidably fitting the bearing 51 in the frame 4 of the motor, the bearing being slidably keyed against rotation with respect to the frame of the motor. The bearing 51 is provided with a flange 53 abutting the edge of a recess in the frame of the motor frame at 54, and is provided with a flange 55 adjacent the hub of the wheel 2. Helical coil springs 56 are arranged in cylindrical recesses 57 having their axes parallel to the axle 1 and are retained under compression between the bottom of the recesses 57 and the end 58 of the motor frame. By this construction the bearing 51 is closely adjacent the hub of the wheel 2, but not in contact therewith, and when the locomotive rounds a curve or passes over any irregularity in the track which causes the motor to be moved toward the wheel, the flange 55 of the bearing 51 comes in contact with the hub of the wheel. The compression of the springs 56 is limited by the flange 55 seating on the end 58 of the frame of the motor. In order to exclude dust from the resilient device an annular shield 59 is fitted on the flange 55 of the bearing and secured thereon by cap screws 60, one end of the shield 61 adjacent the motor frame extending into recesses 62 therein, and the other end of the shield 59 having a packing ring 63 secured thereto which bears on a cylindrical surface 64 formed on the hub.

The foregoing described constructions have been shown as applied at one end of the motor frame adjacent the wheel of the locomotive or car, but it is apparent that the construction may be applied at both ends of the motor frame, and if necessary a suitable abutment may be arranged on the axle adjacent the other end of the motor.

Although I have described several modifications of my invention, I do not desire to be limited to the particular constructions disclosed, and I aim in the appended claims to cover all modifications which do not depart from the spirit and scope of my invention.

What I claim as new and desire to protect by Letters Patent of the United States is:

1. In a locomotive or car having wheels and an axle, a driving motor carried by said axle, means including a thrust ring having a recess and a resilient member arranged between said motor and one of said wheels for resisting axial movement of said motor toward said wheel, and means carried by said wheel having an enlargement arranged in the recess in said thrust ring for limiting the compression and extension of said resilient member.

2. In a locomotive or car having wheels and an axle, a driving motor carried by said axle, and means including a thrust ring having a recess at the inner periphery thereof and a resilient member arranged between said motor and one of said wheels for resisting axial movement of said motor toward said wheel, said wheel having a flange provided with an enlargement arranged in the recess of said thrust ring for limiting the compression and extension of said resilient member.

GEORGE HERBERT FLETCHER.